May 14, 1935.  R. W. CROSSEN, JR  2,001,453
VALVE CONTROL
Filed Aug. 3, 1931  2 Sheets-Sheet 1
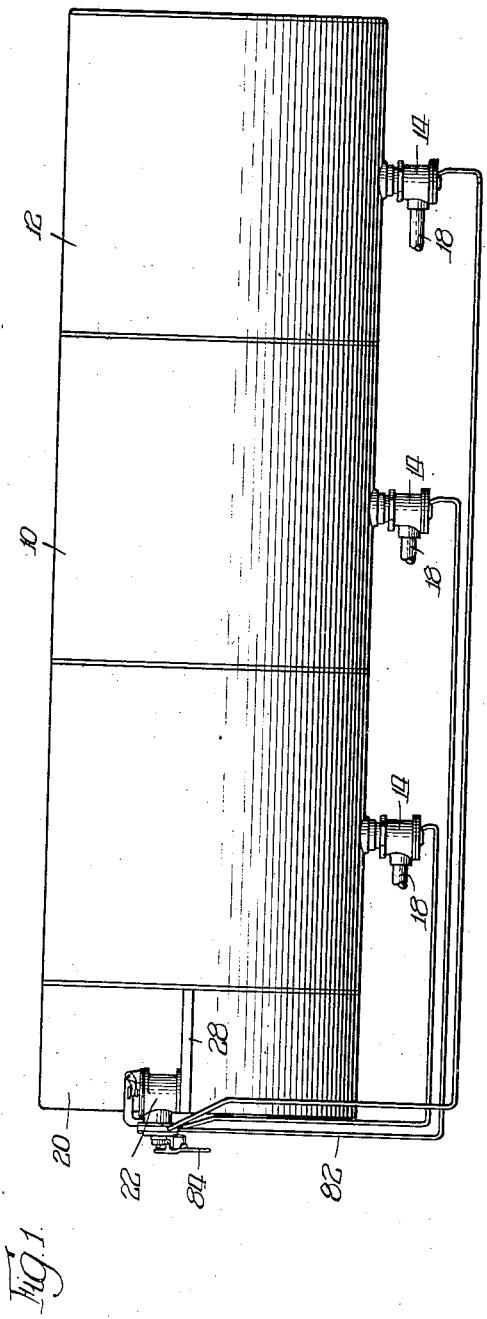
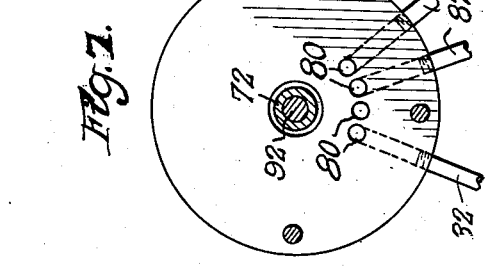
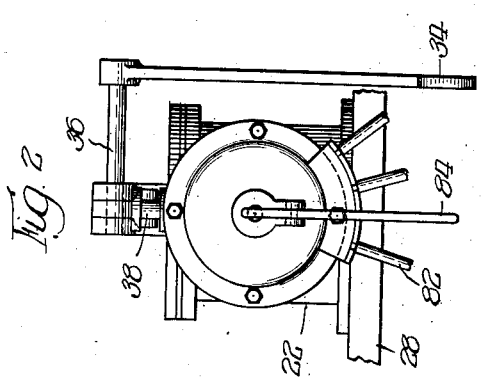
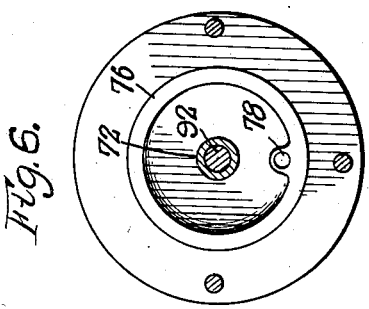
Inventor
Robert W. Crossen Jr.,

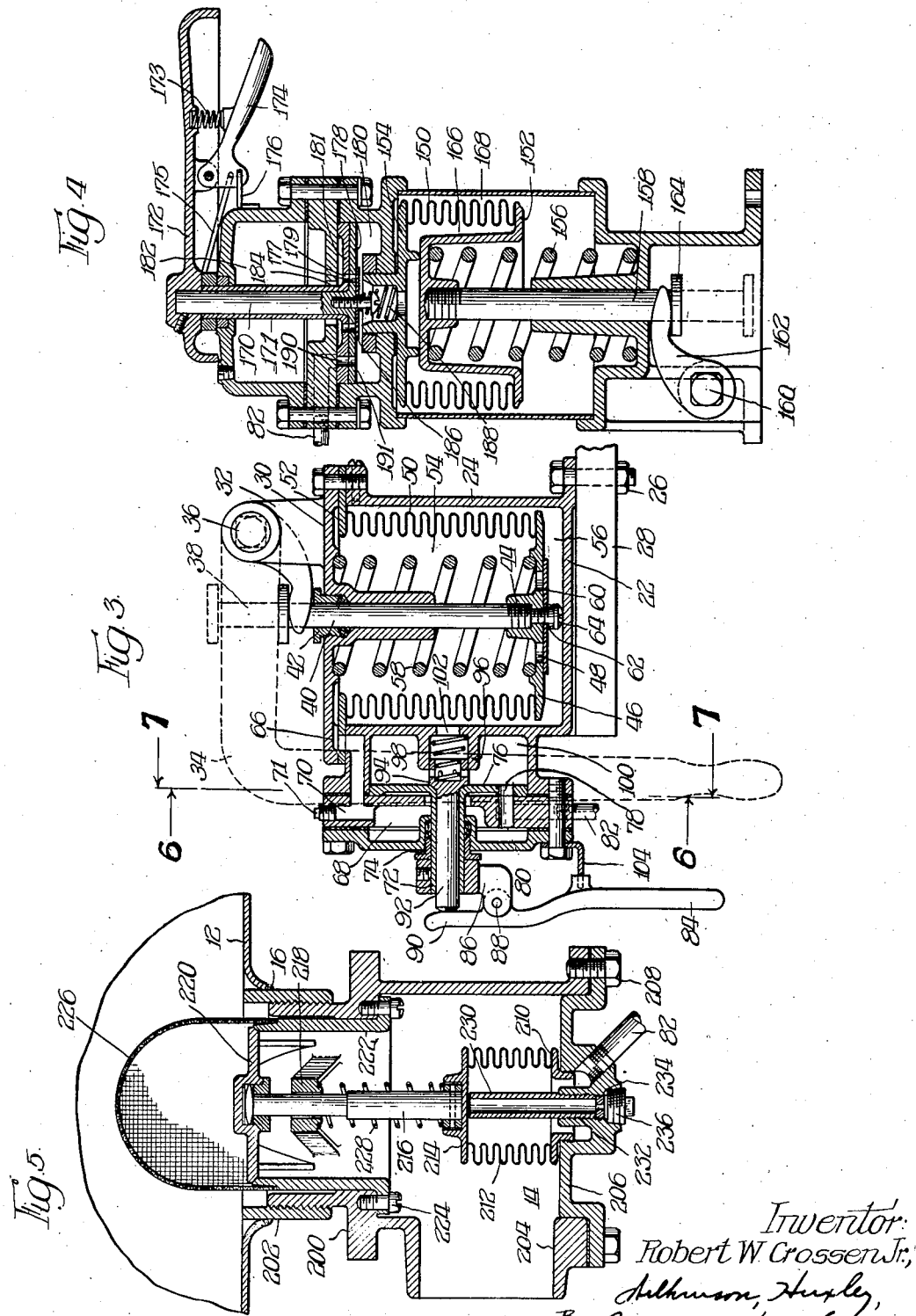

Patented May 14, 1935

2,001,453

UNITED STATES PATENT OFFICE 2,001,453

VALVE CONTROL

Robert W. Crossen, Jr., Plainfield, Ill., assignor to Farrell Manufacturing Company, Joliet, Ill., a corporation of Illinois Application August 3, 1931, Serial No. 554,653

8 Claims. (Cl. 137—21)

This invention pertains to trucks, and more particularly to control mechanism for selectively dispensing fluid from the compartments of tank vehicles.

In certain types of vehicles used for carrying different fluids such as different grades of gasolines and oil it is desirable that control means be provided which is operable from a single point to selectively control the liquid dispensed from the various compartments of the truck. This type of mechanism must be easily controlled, and at the same time must be operable to insure delivery of fluid from the compartments under any conditions.

It is therefore an object of this invention to provide a simple, effective dispensing system for tank vehicles which is operable to selectively dispense liquids from certain tanks of said vehicles.

Another object is to provide control mechanism which is operable under all conditions.

A further object is to provide a system of fluid operation for a control system for tank vehicles and the like.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a diagrammatic elevation of a tank vehicle dispensing system embodying the invention;

Figure 2 is an enlarged end elevation of the control valve for the tank system shown in Figure 1;

Figure 3 is an enlarged sectional elevation through the control valve operating means shown in Figure 2 taken at substantially ninety degrees thereto;

Figure 4 is a sectional elevation of a modified form of control valve operating means;

Figure 5 is an enlarged fragmentary sectional elevation through a portion of the tank and the control valve therefor;

Figures 6 and 7 are sectional views taken on planes indicated 6—6 and 7—7 in Figure 3.

Referring first of all more particularly to the constructions shown in Figures 1 to 3 inclusive, the tank 10 of the tank vehicle is sectionalized, being provided with any number of tanks 12, shown three in number, each of which is provided with the control valve 14 welded as at 16 to each tank adjacent the lowest point thereof. Each control valve is provided with a dispensing pipe or conduit 18 running to a suitable place on the vehicle, it being understood that each pipe may run to a common outlet source. The vehicle is provided with the usual bucket box or compartment 20 in which the control valve operating mechanism 22 is disposed.

The control valve operating mechanism consists essentially of a casing 24 secured at 26 to the platform 28 provided in the bucket box. The casing 24 is closed by means of the cover plate 30 having the standard 32 provided thereon. An operating handle 34 is pivoted as at 36 to the standard 32 and engages the head 38 of the rod 40. The rod 40 extends through a suitable stuffing box 42 provided in the head 30, and extends downwardly and is secured as at 44 to the head member 46 ported at 48, there being provided a flexible diaphragm or sylphon 50 disposed between the head 46 and the member 52 whereby chambers 54 and 56 are provided, the head 46 being normally urged downwardly by means of the spring 58. The ports 48 are normally closed by means of the valve member 60 normally urged to closed position by means of the spring 62 disposed between the valve member 60 and the head 64 provided on the rod member 40.

The chamber 54 is in communication through the passage 66 with the chamber 68 through the passage 70, the chamber 68 being normally supplied with a fluid such as oil as through the fitting 71. Sleeve 72 is rotatably mounted through the stuffing box 74 and is provided with the disk 76, which disk is provided with the aperture 78 adapted to be selectively aligned with channels 80 connected to the various pipes 82 connected to their respective control valves 14. The disk 76 is slightly recessed on its side towards the channels 80 but the recessed portion does not extend to the aperture 78. The disk has a boss around the aperture 78 in a manner similar to that shown by disk 181 in Figure 4. Thus the channels 80 are normally in free communication through the recessed portion of the disk with the reservoir 68 but when the aperture 78 is aligned with one of the channels 80, the communication between the reservoir and the selected channel 80 is cut off. An aperture 81 is provided between the disk 76 and reservoir 68. An operating handle 84 is pivoted to the yoke 86 as at 88 and has an extension 90 adapted to have contact with the plunger 92 mounted in the sleeve 72, the yoke 86 being secured to the sleeve for operation thereof. The plunger is provided with the ported head 94 fitting into the thimble 96 and normally urged outwardly by means of the spring 98 whereby the ports in the head 94 serve to connect the chamber 100 with the chamber 56 through the port 102. The handle 84 is adapted to be engaged in suitable notches in the quadrant 104 for selectively causing communication between the pipes 82 and the port 78.

In the form of operating mechanism shown in Figure 4, the sylphon 150 is mounted between the movable member 152 and the stationary member 154, the movable member being normally urged into engagement with the fixed member 154 by means of the spring 156, there being provided the slidable member 158 secured to the member 152 and operated through a suitable handle (not shown) pivoted at 160 to the operating member 162 engaging the head 164 of the member 158. It will thus be seen that two chambers are provided as at 166 and 168.

The rotatable member 170 is provided with the operating handle 172, said handle being provided with the pivoted lever 174 adapted to selectively engage the quadrant 176 for determining the connection between the pipe 82 and the operating mechanism. The member 174 is urged into engagement with the quadrant by means of the spring 173 and is provided with a rod 175 connected to the sleeve 171 for rotating said sleeve with respect to the member 170. The member 170 is provided with the ported disk 178 rotatably mounted in the chamber 180 and adapted to communicate with the chamber 182 through the channel 184 and through ports 179 in member 181 and registering ports provided in member 178. The disk member 181 is formed substantially similar to disk 76 of Figure 3. The channels 82 are normally in free communication with the reservoir 182 through the recessed portion of the disk. However when the selector valve disk 181 is rotated to align the port 190 with one of the channels 82, the communication between the selected channel and the reservoir is cut off. The ports 179 in disk 178 are normally closed by means of the valve member 186 normally urged to closed position by means of the spring 188. The valve member 186 does not close the aligned ports 190 and 191 which are adapted for selective communication between the chamber 180 and the selected pipe 82.

The control valve 14 is provided with the casing 200 which is secured to the collar 202 which is welded to the tank 12 as at 16. The casing 200 is provided with the suitable outlet passage 204 in communication with the outlet pipe 18. The casing is provided adjacent the bottom thereof with the head 206 secured thereto as at 208, the head being provided with the fixed member 210 having the sylphon 212 disposed therebetween and between the movable member 214. The member 214 is provided with the valve stem 216 extending upwardly through the spider 218 and being provided with the valve member 220 seating on a seat provided on the seat member 222, said member being secured as at 224 to the casing and being of such diameter that the member 222 and its associated mechanism may be readily removed from the casing 200 with the head 206.

A screen 226 is shown disposed on the seat member 222 for preventing foreign matter from causing proper operation of the valve. A spring 228 is provided between the spider and the member 214 for normally urging the valve to closed position. A hollow tubular member 230 is threaded as at 232 into the head and locked by means of the member 234, a drain cap 236 being provided for normally closing the head. The pipe 82 is tapped into the head in communication with the sylphon.

In operation, when it is desired to discharge liquid from one of the tanks 12, referring first of all to the modification shown in Figures 1, 2, 3 and 5, the selecting handle 84 is moved in a clockwise direction as viewed in Figure 3, causing the member 92 to be depressed against the spring 98 whereby the ports in the member 94 close communication between the chamber 100 and the port 102. Rotation of the member 84 is had until the selected notch in the quadrant 104 is arrived at, at which time the member 84 is engaged in said notch, causing registry between the channel 80 and the port 78. Release of the member 84 permits communication between the chamber 100 and the port 102. Operation of the handle 34 causes the head 46 to be moved upwardly whereby the liquid trapped in the sylphon will open the valve 60 and flow through the ports 48 into the chamber 56. Release of the handle 34 causes the liquid trapped in the chamber 56 to flow through the port 102, the port in the member 94, through the port 78, channel 80, and pipe 82, to the sylphon 212, causing the member 214 to move upwardly to open the valve 220, permitting the liquid in the tank 212 to flow through the casing and its dispensing pipe 18. In case the valve 220 becomes stuck or is otherwise rendered inoperative the plug 236 can be removed and the members 234 and 230 adjusted upwardly to move the members 214, 216 and the valve 220 to open position, whereupon the dispensing operation from the tank can be controlled at the end of the discharge pipe 18. In order to release the fluid pressure and permit closing of the valve 220, the disk 76 is rotated thereby placing the channel 80 in communication with the reservoir at the same time the aperture 78 is aligned with aperture 81 through the casing into communication with the reservoir.

A similar operation is had by means of the device shown in Figure 4. The handle 174 is engaged in its selected notch in quadrant 176. In selecting operation the member 174 is moved toward the handle 172, causing the member 175 to rotate the members 171 and 181 whereby ports 179 and 177, and 190 and 191 are misaligned, preventing fluid flow during the adjusting operation. The member 162 is then operated to extend the sylphon 150 against spring 156, causing liquid to be drawn from the chamber 182 through ports 184 and 179 into the chamber 180, and thence into the sylphon. Release of the member 162 causes the spring 156 to move the liquid trapped in the sylphon through the port 190 to the selected pipe 182, the valve 186 seating to prevent back flow through the pipe. Rotation of the selector valve disk 181 will serve to permit return of the fluid to the reservoir and the aperture 190 will be placed in communication with a passage leading to the reservoir in the same manner as described with reference to the modification of Figure 3.

It will thus be seen that with the systems described simple and positive operating mechanisms are provided, and it is to be understood that I do not wish to be limited by the exact embodiments of the device shown which are merely by way of illustration and not limitation, as various and other forms of the device will of course be apparent to those skilled in the art without departing from the spirit of the invention or the scope of the claims.

What is claimed is—

1. In a dispensing system, the combination of liquid reservoirs, a discharge connection to each of said reservoirs, means for selectively permitting and preventing flow from said reservoirs to said discharge connections, a unitary assembly remotely located from said first named means, said assembly comprising a single housing having means disposed therein for selectively operating a single one of said first named means, an expansible member in said first named means for effecting operation thereof, and an expansible member in said housing in pressure communication with said first named expansible member whereby operation of said second named expansible member operates said first named expansible member.

2. An operator mechanism of unitary construction for a fluid pressure operated valve mechanism, including a casing, an expansible member located in said casing whereby said casing is divided into a plurality of chambers, means for moving said expansible member, a check valve for permitting flow from one of said chambers upon movement of said expansible member, a plurality of fluid delivery connections to said casing, and a selector valve for directing fluid from one of said chambers to a selected connection.

3. An operator mechanism for a fluid pressure operated valve mechanism, including a casing, an expansible member located in said casing whereby said casing is divided into a plurality of chambers, means for moving said expansible member, a check valve for permitting flow from one of said chambers upon movement of said expansible member, a plurality of fluid delivery connections to said casing, and a selector for directing fluid from one of said chambers to a selected connection, said selector valve having additional valve means for rendering said operator mechanism inoperative while said connection is being selected.

4. An operator mechanism for a fluid pressure operated valve mechanism, including a casing, an expansible member located in said casing whereby said casing is divided into a plurality of chambers, means for moving said expansible member, a check valve for permitting flow from one of said chambers upon movement of said expansible member, a plurality of connections to said casing, and a selector valve for directing fluid from one of said chambers to a selected connection, said selector valve including a rotatable member and an additional valve member for rendering said operator mechanism inoperative while said connection is being selected.

5. In a dispensing system, the combination of a plurality of liquid reservoirs, a discharge connection from each of said reservoirs, valve means for controlling liquid flow from each reservoir to its discharge connection, a fluid pressure controlled actuator associated with each discharge connection for actuating the corresponding valve means, a unitary actuator remotely situated for transmitting fluid pressure to any one of said first-mentioned actuators, said last-mentioned actuator including a pumping unit, an associated selector valve movable to direct the fluid pressure from said pumping unit to any one of said first-mentioned actuators and valve means associated with said selector valve for preventing transmission of fluid pressure from said pumping unit while said selector valve is being adjusted.

6. An operator mechanism of unitary construction for fluid pressure operated valves comprising a casing including a reservoir and an expansible and reducible chamber, fluid pressure delivery connections to said casing adapted to transmit fluid operating pressure selectively to said fluid pressure operated valves, a check valve in said casing for controlling flow between said reservoir and said expansible and reducible chamber, a movable selector valve in said casing adapted to be positioned to place said expansible and reducible chamber in communication with one of said fluid pressure delivery connections and means for reducing said chamber to transmit fluid pressure to the selected fluid pressure operated valve.

7. An operator mechanism of unitary construction for fluid pressure operated valves comprising a casing having a fluid reservoir and a pumping chamber therein, a pumping member movable for expansion and reduction of said pumping chamber, a check valve controlling flow from said reservoir to said pumping chamber, a plurality of fluid delivery connections to said casing normally in free communication with said reservoir, said connections being adapted to transmit fluid pressure to said fluid pressure operated valves, a movable selector valve in said casing, said valve being movable to cut off communication between one of said fluid delivery connections and said reservoir and to place said desired fluid delivery connection in communication with said pumping chamber whereby fluid pressure will be transmitted to operate the desired fluid pressure operated valve.

8. An operator mechanism for fluid pressure operated valves comprising a casing having a fluid reservoir and a pumping chamber therein, a pumping member movable for expansion and reduction of said pumping chamber, a check valve controlling flow from said reservoir to said pumping chamber, a plurality of fluid delivery connections to said casing normally in free communication with said reservoir, said connections being adapted to transmit fluid pressure to said fluid pressure operated valves, a movable selector valve in said casing, said valve being movable to cut off communication between one of said fluid delivery connections and said reservoir and to place said desired fluid delivery connection in communication with said pumping chamber whereby fluid pressure will be transmitted to operate the desired fluid pressure operated valve and means for preventing transmission of fluid pressure from said pumping chamber while said selector valve is being adjusted.

ROBERT W. CROSSEN, Jr.

CERTIFICATE OF CORRECTION.

Patent No. 2,001,453.  May 14, 1935.

ROBERT W. CROSSEN, JR.

It is hereby certified that error appears in the printed specification of the above numbered patent requiring correction as follows: Page 3, first column, line 40, claim 3, after "selector" insert the word valve; and line 53, claim 4, before "connections" insert the words fluid delivery; and that the said Letters Patent should be read with these corrections therein that the same may conform to the record of the case in the Patent Office.

Signed and sealed this 9th day of July, A. D. 1935.

(Seal)

Bryan M. Battey
Acting Commissioner of Patents,